United States Patent [19]

Dunaitschik

[11] Patent Number: 4,499,847

[45] Date of Patent: Feb. 19, 1985

[54] APPARATUS FOR COATING GRANULES SUCH AS DRAGÉE PELLETS WITH A HARDENABLE SUBSTANCE

[75] Inventor: Rudolf Dunaitschik, Bodolz, Fed. Rep. of Germany

[73] Assignee: Driam Metallprodukt GmbH & Co. KG, Eriskirch, Fed. Rep. of Germany

[21] Appl. No.: 377,033

[22] Filed: May 11, 1982

[30] Foreign Application Priority Data

Aug. 12, 1981 [DE] Fed. Rep. of Germany ....... 3131808

[51] Int. Cl.³ .............................. B05C 5/00; B05C 3/08
[52] U.S. Cl. ......................................... 118/19; 118/20; 118/303; 366/105; 366/188
[58] Field of Search ...................... 118/19, 20, 21, 303, 118/707, 418; 427/3; 34/130, 138; 366/105, 106, 107, 228, 188, 184, 189

[56] References Cited

U.S. PATENT DOCUMENTS

| 475,840 | 5/1892 | Woods | 118/19 |
|---|---|---|---|
| 1,122,660 | 12/1914 | Sturtevant | 366/188 |
| 1,212,859 | 1/1917 | Weiss | 366/188 |
| 3,748,249 | 7/1973 | Barton | 118/418 X |
| 4,157,734 | 6/1979 | Hines | 366/188 X |
| 4,162,680 | 7/1979 | Coch | 118/418 X |

FOREIGN PATENT DOCUMENTS

| 0012241 | 11/1956 | Fed. Rep. of Germany | 366/228 |
|---|---|---|---|
| 2047571 | 3/1972 | Fed. Rep. of Germany | 118/19 |
| 2805801 | 8/1979 | Fed. Rep. of Germany | 118/19 |
| 0007747 | 4/1979 | Japan | 118/20 |
| 0020456 | of 1889 | United Kingdom | 366/228 |

Primary Examiner—John P. McIntosh
Attorney, Agent, or Firm—Karl F. Ross; Herbert Dubno

[57] ABSTRACT

A drum rotating about a horizontal axis, designed to coat dragée pellets or other granules with a hardenable substance, has a polygonal—preferably nine-sided—peripheral wall and corresponding frustopyramidal end walls. The peripheral wall consists of angularly adjoining panels and has an access aperture extending partly over two such panels, this aperture being sealable by a gabled flap hinged to the drum at its trailing edge and adapted to be locked in a closed position by a sliding bolt coacting with a latching cylinder and an unlatching cylinder in a certain angular position of the drum whereby the unlatched flap will swing open on leaving that position and will swing closed on reapproaching it. Each panel is provided with a longitudinally extending grid, formed by a perforated sheet-metal strip, through which drying air is admitted from below into a granule bed; part of this air passes through slantingly disposed inwardly projecting perforated baffles which stir the granules and deflect them toward a transverse midplane of the drum where accompanying detritus can escape through the grids to the outside.

20 Claims, 6 Drawing Figures

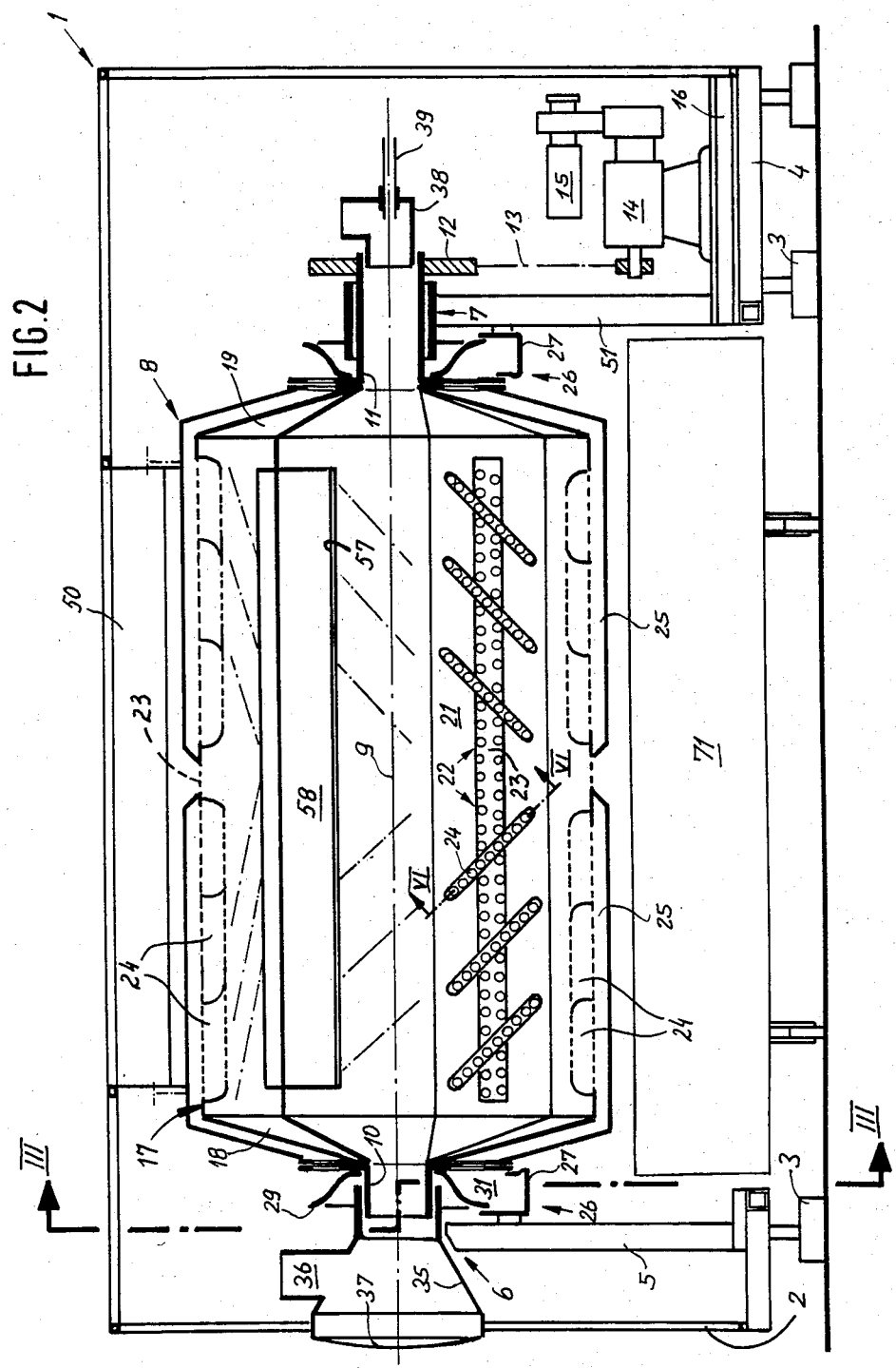

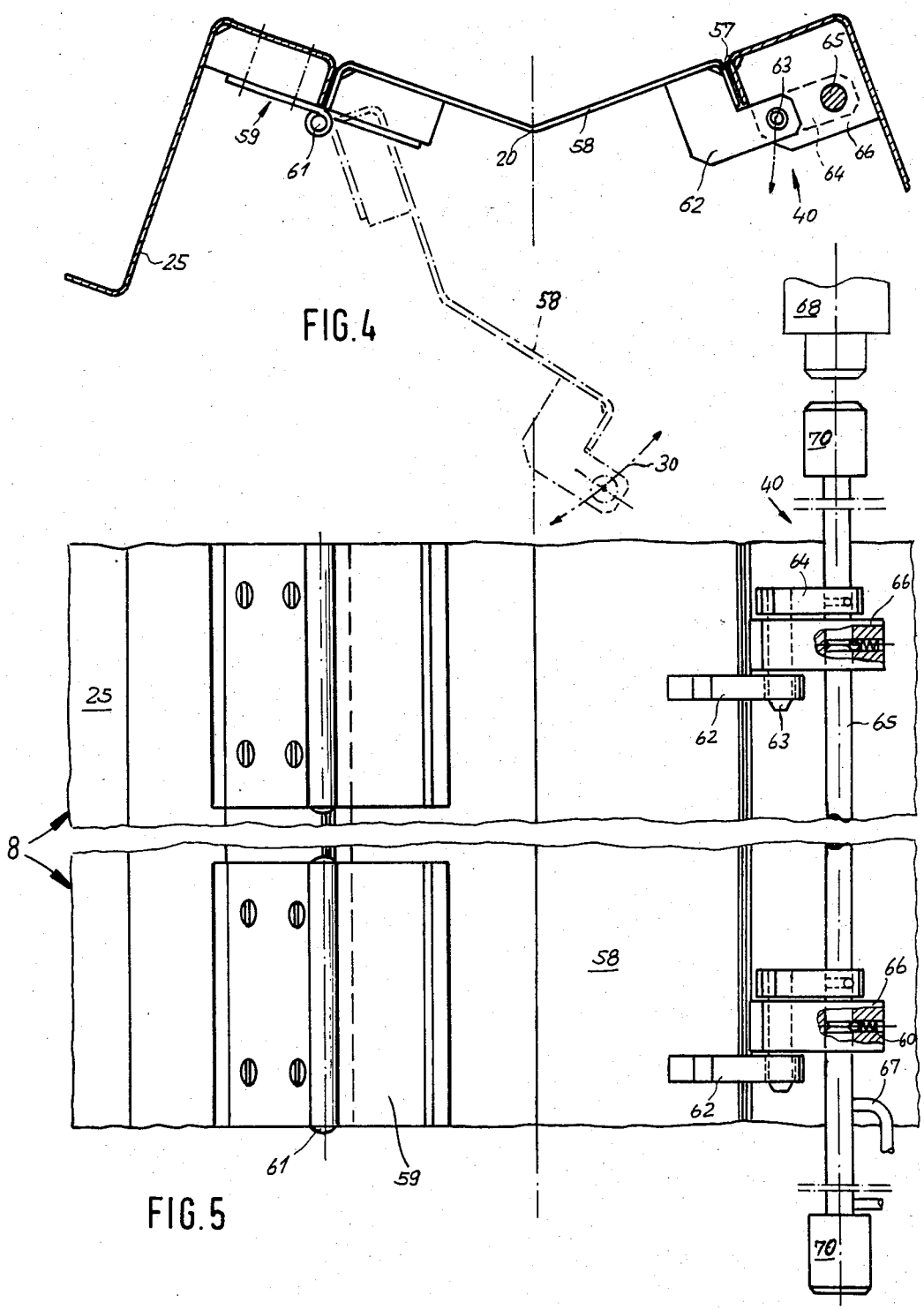

APPARATUS FOR COATING GRANULES SUCH AS DRAGéE PELLETS WITH A HARDENABLE SUBSTANCE

FIELD OF THE INVENTION

My present invention relates to an apparatus for coating granules such as dragée pellets with a hardenable substance, and drying the resulting layers, by tumbling the granules in a drum which is rotatable about a substantially horizontal axis. The drum may be provided with baffles for stirring the granules, protruding inward from its peripheral wall, and with ventilation means for passing a gaseous drying fluid, such as air, from below through the granule bed independently of the rotary position of the drum.

BACKGROUND OF THE INVENTION

An apparatus of this kind is the subject matter of an earlier invention of mine disclosed in German laid-open application No. 28 05 801. In that case, the drum is provided on its inner cylindrical surface with guide baffles having aerating holes on a small area while additional air circulation is facilitated by laterally perforated hollow blades disposed at the frustoconical end walls thereof. Since, apart from the guide baffles and blades, all surfaces bounding the interior of the drum are centrally symmetrical about its axis of rotation, the granules are not strongly entrained during the tumbling process so that their lower strata tend to slide down along the drum wall. The coating of the granules is thereby subjected during hardening to increased wear under locally nonuniform stress whereby an uneven thickness results. The coating can therefore protect the granules only to an insufficient degree since the efficiency of protection is determined by the thickness of the covering layer at its weakest spot. The uniformity of the layer thickness is particularly important in the case of thin-walled capsules for liquid active agents in the pharmaceutical industry.

OBJECTS OF THE INVENTION

An object of my present invention is to improve an apparatus of the aforedescribed kind in a manner designed to reduce the tendency of the granules to slide down the drum wall, to enhance their tendency to roll along the top surface of the bed and thereby to make the thickness of the coating more uniform.

Another object is to provide improved means for loading and unloading a rotary drum in an apparatus of this type.

SUMMARY OF THE INVENTION

In accordance with a feature of my invention, a drum of the character referred to has a peripheral wall in the shape of a hollow regular prism formed from a multiplicity of flat panels along parting edges parallel to its axis of rotation, these panels defining respective inner prism faces and having each an axially extending perforated midzone. A set of hollow elongated baffles extend on each prism face across its midzone and, while lying in a lower region of the drum, project into an overlying granule bed for agitating the granules. A source of pressurized drying fluid, referred to hereinafter as air, communicates with conduit means forming supply channels on the outer surfaces of the panels, these channels being aligned with the midzones of the associated panels for feeding air under pressure through the perforations thereof to the interior of the drum while the respective channels lie below the granule bed; part of this air passes from the supply channels directly into the bed while another part reaches the granules through perforated extremities of the baffles that are laterally offset from the corresponding midzone. The baffles thus have the dual function of operating as stirrers and as ancillary air nozzles.

Advantageously, the baffles are so inclined to the drum axis as to deflect the granules in a generally axial direction during rotation of the drum. With unidirectional rotation, the baffles of each set may form two mirror-symmetrical groups on opposite sides of a transverse midplane toward which the granules are swept along with accompanying detritus. With the perforations of the midzones of the panels opening directly into the surrounding atmosphere in the vicinity of that midplane, the comminuted particles constituting this detritus are ejected through them by a combination of gravity, centrifugal force and the prevailing pressure differential.

The midzone of each panel may be constituted by a grid extending over nearly its full length, specifically a perforated strip of sheet metal. The supply channels feeding in the compressed air may extend from two distributors, adjacent the end walls of the drum, toward the middle but terminate short of the transverse midplane to leave the central part of each grid exposed for the purpose described.

Such an arrangement results in a more positive rotary entrainment of the contents of the drum, causing the surface of the granule bed to be tilted beyond the angle of repose of the particles so that the majority of the granules roll down along this surface and a substantially continuous turnover of the bed is achieved. Since the granules can slide down only along the planar prism faces, the baffles mounted on the inner panel surfaces decrease their tendency to slide. By their protrusion from the drum periphery into the granulated mass they initially anchor the bed to the drum wall but thereafter, upon emerging at the upper end of the inclined granule bed, they operate as agitator blades promoting the initiation of the rolling motion.

Advantageously, the baffles are demountably attached to the drum wall and are exchangeable against others of different shape. This enables a fairly rapid changeover to a shape most suitable for the material to be processed next. The detachable mounting of the baffles on the planar prism faces is simple. The planarity of these faces also enables the baffles to be made swingable, for an adjustment of their slant relative to the axial direction, about tubular stems communicating with the associated supply channels to serve as conduits for part of the drying air.

The choice of the number of sides of the polygonal drum profile is determined by various considerations. The larger that number, the smaller is the torque exerted by the panels upon the granule bed; with a 12-sided drum, for example, the rotary entrainment of the granulated mass becomes insufficient to obviate the above-discussed drawback of cylindrical drums. With a square or even a hexagonal profile, on the other hand, the perforations of the baffles of only one prism face will lie at a given instant low enough within that mass (which fills only part of the volume of the drum) to have the desired aerating effect. I have found a nonagonal drum profile to be an optimal solution.

The drum described and shown in the above-identified German publication is loaded and unloaded through a central access aperture in one of its end walls. With a drum of considerable axial length, however, such an end aperture is inconvenient for charging and even less suitable for discharging. In accordance with another feature of my present invention, therefore, I provide the peripheral drum wall with an axially extending access aperture along with a lid which covers that aperture in a closed position and leaves it uncovered in an open position. The lid can be locked in its closed position by latch means under the control of actuating means mounted on a stationary machine frame, the actuating means being selectively operable for alternately displacing the latch means into a lid-engaging and a lid-disengaging position.

When the lid is hinged at its trailing edge (as viewed in the direction of rotation) to the peripheral drum wall, gravity will let it swing open at a certain point on the descending side of the drum and will let it swing closed at an earlier point. With the actuating means suitably positioned at that descending side on a level above the first and below the second point, the lid will automatically uncover the access aperture upon disengagement of its leading edge from the latch means in one pass through that level and will be re-engageable by the latch means upon the next pass. The latch means may comprise a sliding bolt shiftable in axial direction by the actuating means which may comprise a pair of pushers confronting opposite ends of that bolt. In principle, however, it is also possible to use a single—e.g. electromagnetic—actuator, such as one of the contactless type. The bolt may be yieldably retained by indexing means in either of its two limiting positions.

With its access aperture uncovered, the drum can be loaded from hopper means disposed above it on the machine frame at a location offset from the angular position in which the lid is being locked and unlocked by the external actuating means through the intermediary of the latch means. A retractable shutter on the hopper means may comprise a chute swingable from above into the uncovered access aperture.

My improved loading and unloading mechanism enables the charging of lengthy coating drums in the shortest time with large amounts of granules to be treated and also facilitates their rapid discharge. This is particularly important for recently developed production techniques utilizing efficient transportation and packaging systems whose performance has to be matched by the coating operation in the context of the overall manufacturing process which is governed to a large extent by a central control system.

The aperture-covering lid, which may be substantially narrower than a prism face, extends advantageously across the parting edge separating adjacent panels. Thus the access aperture is bounded by two inwardly diverging prism faces, which favors the discharge of the drum's contents when that aperture lies at the lowest point of the drum periphery.

A further improvement of the discharging process can be achieved by intermittently rotating the coating drum, preferably in abrupt steps, over an angular unloading range extending from a lateral position of the access aperture beyond its lowermost position. In this manner the granule bed is continuously kept in motion during the discharge, with the adhesion between the drum wall and the granules decreased by the recurrent jolting. As the emptying of the drum occurs not in a certain rotary position but continuously over such a large range, the finished product leaves the drum on both sides of the access aperture.

The drum can be automatically unloaded and immediately reloaded during a single stepwise revolution by sequential control means which can also bring about the intermittent rotation during discharge by repeated on and off switching, preferably with intervening abrupt braking.

BRIEF DESCRIPTION OF THE DRAWING

A preferred embodiment of my invention is illustrated by way of example in the accompanying drawing in which:

FIG. 2 is a side view of the apparatus of FIG. 1, partly in longitudinal section taken along line II—II of FIG. 3;

FIG. 4 is an enlarged fragmentary detail view, partly in section, of the lower periphery of a coating drum in a bottom position of an access aperture with a closure flap swung open;

FIG. 5 is a bottom view of the detail shown in FIG. 4; and

SPECIFIC DESCRIPTION

Figure 1:
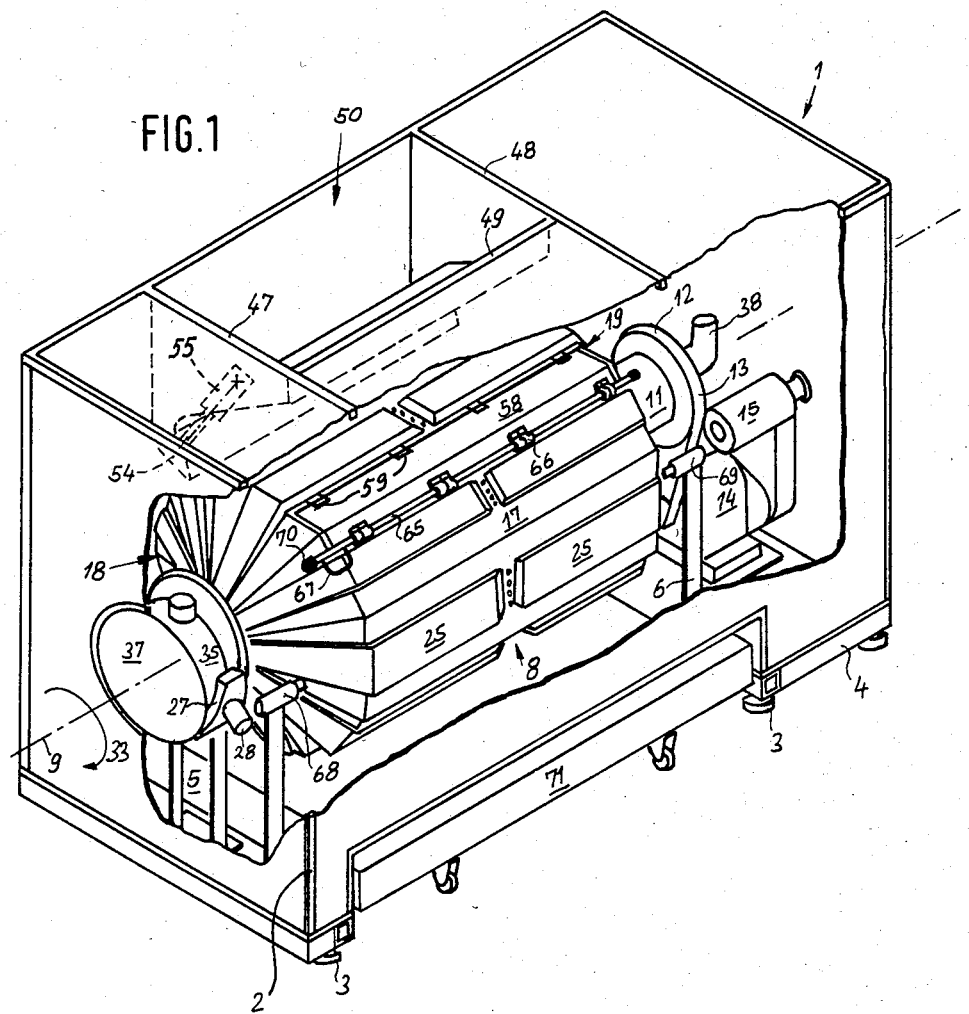
FIG. 1 is a perspective view of a pellet-coating apparatus according to the present invention.

The apparatus shown in the drawing has a housing 1 comprising a frame 2 with a floor plate 4, formed from strong profile tubes, standing on feet 3. This floor plate 4 supports two roller-type journal bearings 6, 7 via respective posts 5, 51 which carry a coating drum 8 by means of hub extensions 10, 11 centered on the axis of rotation 9 of the drum. Hub extension 11 protrudes beyond the rear journal bearing 7 and carries a sprocket wheel 12 driven via a chain 13 and a steplessly adjustable transmission 14 by an electric motor 15. Transmission 14 is combined with post 51 and a base 16 into a unit bodily attached to the floor plate 4.

The coating drum 8 has a prismatic peripheral wall 17 of nonogonal cross-section and frustopyramidal end walls 18, 19 inserted between wall 17 and hubs 10, 11. Walls 17, 18 and 19 are each composed of nine flat panels welded together. The drum is divided mirror-symmetrically into two halves separated by a transverse midplane. In each of the nine prism faces 21 of peripheral wall 17, bounded by longitudinal parting edges 20, there are disposed two ventilation ports 22 which are part of a common grid in the form of a perforated sheet-metal strip 23 and include a group of three baffles on each side of that midplane. Each baffle also consists of perforated sheet metal and has generally the shape of an elongated semicylinder, with rounded ends, which is demountably and exchangeably attached to the respective prism face 21 by fastening means not shown. The underside of each baffle is open to allow drying air, entering the drum through strips 23 as more fully described below, to pass also laterally of these strips into an overlying bed of granules. The baffles 24 are inclined at 45° to the axial direction and, upon rotation of the drum, tend to deflect the granules toward the aforementioned midplane. Several sets of baffles have been represented in FIG. 2 only by phantom lines. Supply channels 25, disposed on the outside of the coating drum along the longitudinal centerline of each prism face 21, serve to feed drying air to the ports 22 from respective distributors 26 located between end walls 18, 19 and the corresponding bearings 6, 7.

Figure 3:
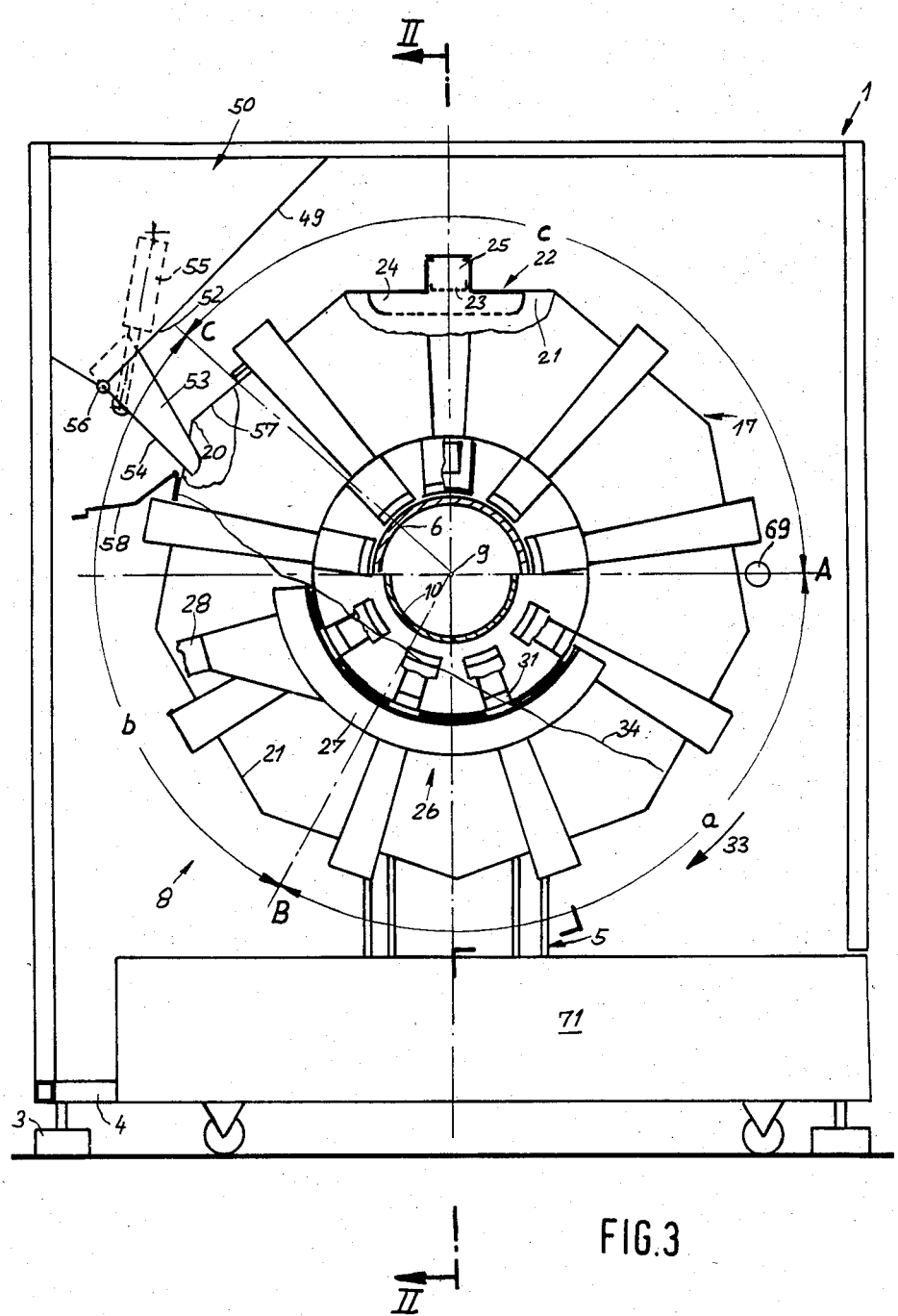
FIG. 3 is a cross-sectional view taken along line III-—III of FIG. 2.

As is apparent from FIGS. 1 to 3, each distributor 26 comprises an arcuate shell segment 27 receiving via a line 28, e.g. from a blower, drying air at a treatment temperature depending on the goods being tumbled and under a gauge pressure of up to 500 millimeters of water column. The distributor segment 27 is concave toward axis 9 and feeds drying air to an annular half-shell 29, attached to the drum, whose interior is divided into compartments 31 which communicate with supply channels 25 respectively connected thereto and are open radially toward the outside. Thus, these channels coact in the lower region of drum 8 with the distributor segment 27 but are vented in the upper region to the atmosphere.

Whereas the sheet-metal strips 23 extend each over almost the entire length of the panels in a midzone of a prism face 21, the supply channels 25 lead in from opposite ends and terminate short of the transverse midplane. Thus the interior of the drum is also in connection with the surrounding atmosphere over a limited area through the perforations of strips 23 in the middle of the drum. Detritus or other powdery material accompanying the granules, swept by the baffles 24 to the center of the drum, can therefore pass to the outside where it can be exhausted in order to prevent its mixing with the finished product.

With this arrangement the drying air can be blown in under pressure by way of distributors 26, supply channels 25 and ventilation ports 22 to enter the granule bed from below. Since the coating drum rotates clockwise according to an arrow 33 as viewed in FIG. 3, the granule bed is shifted toward the ascending side up to about a level indicated by a line 34, which is taken into consideration in a corresponding angular offset of the distributing segments 27 with reference to the vertical axial plane of the drum.

Thus, the drying air extending under its supply pressure in part from the holes of sheet-metal strips 23 and in part from the perforations of baffles 24 lifts the granules somewhat and reduces their frictional contact with the drum as well as any attrition resulting therefrom. The drying air rising above the granule bed can exit only to a limited extent through channels 25, on account of the throttling effect of the small cross-sections of the perforations, and thus flows predominantly through the two hubs 10, 11 axially to the outside. The air passes from the front hub 10 to a frustoconically diverging head 35 beyond bearing 6 and leaves it upwardly through a nipple 36. While the outer end of head 35 is closed by a hinged cover 37 provided with a viewing glass, the air can escape to the outside from the rear hub 11 through an elbow-shaped piece of tubing 38 occupying nearly the entire cross-section of that hub. A conduit 39 axially traverses the tubing 38 for spraying the coating substance into the drum at the start of a tumbling operation.

Thanks to the polygonal profile of the drum and to the inwardly projecting baffles 24, the granules are positively entrained in the particulate mass over nearly their entire area of contact with the drum walls. This means that the parts of the granule bed adjacent the peripheral drum wall remain stationary with reference thereto and can disengage themselves only after having been lifted above the horizontal axial plane of the drum.

Thereby the slope of the bed surface 34 is significantly increased at least in its upper region, as compared with the angle of repose of the granulated material. As a result, the granules will roll readily over this surface 34 whose slope decreases somewhat toward its lower end. At any rate, a sliding of the granules along the peripheral drum wall—which would impair the uniformity of the thickness of the coating layer—is largely avoided and the rolling motion enhancing this uniformity becomes substantially more pronounced as compared with tumbling in drums of conventional cylindrical structure.

Since the baffles 24 are easily demountable from the prism faces 21, they can be readily exchanged against differently configured deflectors. Each set of baffles could be combined with the associated sheet-metal strips 23 into a replaceable unit. This is particularly desirable where the air supply must be adapted to the nature of the dragée material.

Figure 6:
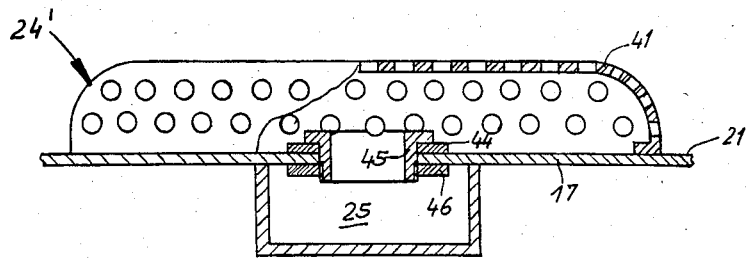
FIG. 6 is a partly sectional side view of a perforated baffle taken generally along line VI—VI of FIG. 2.

FIG. 6 shows a way of making the baffles angularly adjustable. For this purpose a web 44 is clamped at the center of a modified baffle 24' by a flanged bushing 45, passing through an opening of the drum wall 17, and by a grooved nut 46 so that the drying air can flow from the feed channel 25 into the interior of the baffle and can pass from there into the drum. Whether or not a perforated sheet-metal strip 23 is fixedly mounted in the drum wall, as shown in FIG. 2, the angle of inclination of the baffles 24' can be changed by rotating them about the tubular stem 45 which is perpendicular to the prism face 21.

A hopper 50 is formed on frame 2 by two partitions 47, 48 and a sloping bottom 49, inclined by 45°, together with one sidewall of the housing. The volume of the hopper 50 is designed to accommodate the largest charge of dragée pellets or capsules to be processed in one operating cycle.

An outlet 52 in the sloping bottom 49 of the hopper extends over the full length thereof and can be closed by a hinged shutter 54; the latter has sidewalls 53 and is thus designed as a chute. Shutter 54 can be swung by a compressed-air cylinder 55 around an axis 56, parallel to the drum axis 9, between an open position shown in FIG. 3 and a closed position not illustrated.

In its open position, shutter 54 reaches into an access aperture 57 which extends over virtually the full length of the drum wall 17 at opposite sides of a parting edge 20, separating a pair of adjacent prism faces 21, close to their perforated strips 23. This access aperture can be closed by a lid designed as a gabled flap 58, conforming to the polygonal shape of the drum, which is pivoted at its trailing edge (as viewed in the direction of rotation) to wall 17 by hinges 59 for swinging about an axis 61, parallel to the drum axis 9, as best seen in FIGS. 4 and 5. FIG. 4, however, shows the closure flap reversed as compared with FIGS. 1 and 3, i.e. as viewed from the right in FIG. 2, so that the sense of rotation of the drum is counterclockwise in FIG. 4 instead of clockwise as indicated by arrow 33 in FIG. 3.

Brackets 62, attached to the free leading edge of flap 58, have eyes engageable by locking pins 63 of a latching mechanism in the aperture-closing position. The locking pins 63 are fixedly secured by respective arms 64 to an elongated cylindrical bolt 65 which is longitudinally shiftable in pillow blocks 66 attached to the drum wall 17. The bolt can be shifted manually from its latching position, shown in FIG. 5, with the aid of a welded-on handgrip 67 until the locking pins 63 are released from the brackets 62. The latching and unlatching positions are established by indexing pins 60 in pillow blocks 66 yieldably engaging in respective grooves of bolt 65.

For automatic actuation, however, abutment heads 70 screwed onto opposite ends of bolt 65 coact with two compressed-air cylinders coaxially confronting each other in a horizontal axial plane of the drum, namely a latching cylinder 68 and an unlatching cylinder 69. The two compressed-air cylinders 68, 69 are disposed at the descending side of the drum adjacent a rotary position A of latch bolt 65.

When, upon completion of a coating operation, bolt 65 passes into its rotary position A, the drum 8 is briefly halted and the unlatching cylinder 69 is actuated so that, upon further rotation in the clockwise direction according to arrow 33 (FIG. 3), the freely hanging closure flap 58 progressively uncovers the access aperture 57 and the finished dragées are discharged as soon as this aperture begins to clear the lower (right-hand) edge of the bed surface 34. The granules dropping from drum 8 are caught by a carriage 71, disposed below the drum in housing 1, which thereafter is extracted from the housing and unloaded. Alternatively, the dragées could be transferred directly or via an intermediate funnel to some other transport system such as, for example, a conveyor belt.

The discharging process extends from position A over an angle a to substantially a rotary position B. In sector a the drum is moved only in steps and, preferably, joltingly as with brief on and off switching of its drive and possibly with intervening braking.

Next, the drum is continuously turned through an angle b up to a charging position C in which it is loaded, by means of hopper 50 as already described, immediately after the discharge. When shutter 54 has been swung closed, the drum is continuously rotated through an angle c up to its starting position A whereby the flap 58 passes into its closed position under the action of gravity; it is then latched in that position by a shifting of bolt 65 with the aid of cylinder 68.

In a conventional manner, coating substance can be sprayed in by way of conduit 39 in order to be distributed by a slow rotation of the drum over the surface of the particles to be treated. The resulting layers covering these particles are substantially uniformly hardened by the circulation of drying air through the drum. The coating process can be controlled fully automatically, just as the subsequent steps of unloading and reloading.

I claim:

1. An apparatus for coating granules with layers of a hardenable substance and drying said layers, comprising:

a drum rotatable about a substantially horizontal axis and provided with a closable access aperture enabling its loading and unloading, said drum having a peripheral wall in the shape of a hollow regular prism formed from a multiplicity of flat panels adjoining one another at obtuse angles along parting edges parallel to said axis and defining respective inner prism faces, each panel having an axially extending perforated midzone;

a set of hollow elongated baffles on each of said prism faces extending across the respective midzone and projecting in a lower region of the drum into an overlying granule bed for agitating the granules thereof, each baffle having perforated extremities laterally offset from the perforated midzone of the respective panel; and conduit means communicating with an external source of pressurized drying fluid and forming supply channels on the outer surfaces of said panels aligned with the midzones thereof for feeding drying fluid from said source through the perforations of panels underlying the granule bed to the interior of the drum, part of the drying fluid passing from said supply channels directly into the granule bed via said midzones while another part enters the baffles on the underlying panels and reaches the granule bed through the perforated extremities thereof.

2. An apparatus as defined in claim 1 wherein the baffles of each set are inclined to said axis for deflecting said granules in a generally axial direction during rotation of said drum.

3. An apparatus as defined in claim 2 wherein the baffles of each set form two mirror-symmetrical groups on opposite sides of a transverse midplane, the baffles of each group being slanted to deflect the granules toward said transverse midplane during rotation of the drum in a predetermined direction, the perforations of each midzone opening directly into the surrounding atmosphere in the vicinity of said transverse midplane for facilitating an ejection of comminuted particles accompanying the granules deflected by said baffles.

4. An apparatus as defined in claim 2 or 3 wherein said baffles are swingable about tubular stems perpendicular to said prism faces, said stems opening into the associated supply channels for admitting drying fluid into said baffles.

5. An apparatus as defined in claim 3 wherein said perforated midzone is formed by a grid extending over substantially the full length of each panel, said drum further having a pair of end walls separated by said peripheral wall and centered on said axis, said conduit means including two distributors adjacent said end walls, said supply channels extending from each of said distributors toward said transverse midplane and terminating short of the latter to leave a central part of each grid exposed to the atmosphere.

6. An apparatus as defined in claim 5 wherein said grid is a perforated strip of sheet metal.

7. An apparatus as defined in claim 5 wherein said end walls are frustopyramidal with a polygonal profile conforming to that of said peripheral wall.

8. An apparatus as defined in claim 7 wherein said profile is nonagonal.

9. An apparatus as defined in claim 5 wherein said end walls are provided with axially outwardly extending tubular hubs journaled in coaxial bearings, said hubs communicating with the interior of said drum for venting introduced drying fluid to the atmosphere.

10. An apparatus for coating granules with layers of a hardenable substance and drying said layers, comprising:

a stationary frame;
    a drum rotatable on said frame about a substantially horizontal axis, said drum having a peripheral wall and a pair of adjoining end walls centered on said axis, said peripheral wall being formed with an axially extending access aperture for loading and unloading the drum;
    a lid displaceable on said peripheral wall between a closed position covering said access aperture and an open position leaving said access aperture uncovered, said lid being hinged at a trailing edge thereof to said peripheral wall for swinging about a pivotal axis parallel to said substantially horizontal axis;

latch means on said peripheral wall engageable with a leading edge of said lid remote from said pivotal axis for locking same in said closed position thereof, said latch means including an elongated bolt adjacent and parallel to said leading edge and coacting formations on said bolt and on said lid, said bolt having opposite ends projecting beyond said lid and being axially shiftable on said peripheral wall; and actuating means on said frame confronting the projecting ends of said bolt in a predetermined angular position of said drum, said actuating means being selectively operable for alternately shifting said bolt into a lid-engaging and a lid-disengaging position.

11. An apparatus as defined in claim 10 wherein said predetermined angular position lies at a descending side of the drum on a level below a point where the lid swings by gravity into said closed position and above a point where the lid swings by gravity into said open position whereby said lid uncovers said access aperture automatically upon being disengaged from said latch means and is re-engageable by said latch means upon again approaching same.

12. An apparatus as defined in claim 11 wherein said actuating means comprises a pair of pushers confronting opposite ends of said bolt for shifting same in one direction for engagement with said lid and in an opposite direction for disengagement therefrom.

13. An apparatus as defined in claim 12 wherein said pushers are controlled by respective compressed-air cylinders.

14. An apparatus as defined in claim 11 wherein said peripheral wall has the shape of a hollow regular prism formed from a multiplicity of flat panels adjoining one another at obtuse angles along parting edges parallel to said substantially horizontal axis, said access aperture extending into two adjoining panels across the intervening parting edge, said lid being gabled with a ridge in line with said intervening parting edge.

15. An apparatus as defined in claim 11, further comprising hopper means on said frame disposed above said drum at a location offset from said predetermined angular position, said hopper means having a shutter retractable upon passage of said access aperture therebelow with said lid in said open position thereof.

16. An apparatus as defined in claim 15 wherein said shutter comprises a chute swingable from above into the uncovered access aperture.

17. An apparatus as defined in claim 10 or 12, further comprising indexing means for yieldably retaining said bolt in said lid-engaging and said lid-disengaging position.

18. An apparatus as defined in claim 10 wherein said drum is provided with drive means for continuously rotating same in the closed position of said lid and intermittently rotating same through a substantial fraction of a turn past an unloading station in the open position of said lid.

19. An apparatus for coating granules with layers of a hardenable substance and drying said layers, comprising:

a stationary frame;

a drum rotatable on said frame about a substantially horizontal axis, said drum having a peripheral wall and a pair of adjoining end walls centered on said axis, said peripheral wall having the shape of a hollow regular prism formed from a multiplicity of flat panels adjoining one another at obtuse angles along parting edges parallel to said substantially horizontal axis, said panels each having a perforated midzone communicating through an external channel with a source of pressurized drying fluid, said peripheral wall being formed with an axially oriented access aperture extending into two adjoining panels across the intervening parting line but terminating short of the perforated midzones thereof for loading and unloading the drum;

a gabled lid having a ridge in line with said intervening parting edge, said lid being displaceable on said peripheral wall between a closed position covering said access aperture and an open position leaving said access aperture uncovered;

latch means on said peripheral wall engageable with said lid for locking same in said closed position thereof; and actuating means on said frame confronting said latch means in a predetermined angular position of said drum, said actuating means being selectively operable for alternately displacing said latch means into a lid-engaging and a lid-disengaging position.

20. An apparatus as defined in claim 19 wherein said lid is hinged at a trailing edge thereof to said peripheral wall for swinging about a pivotal axis parallel to said substantially horizontal axis, said latch means being engageable with a leading edge of said lid remote from said pivotal axis.

* * * * *